United States Patent
Okabe et al.

(10) Patent No.: US 11,721,819 B2
(45) Date of Patent: Aug. 8, 2023

(54) FUEL CELL SYSTEM AND AIR VEHICLE

(71) Applicant: TOYOTA JIDOSHA KABUSHIKI KAISHA, Toyota (JP)

(72) Inventors: Hiroki Okabe, Mishima (JP); Tomohiro Shinagawa, Shizuoka-ken (JP); Yoshihiro Shinozaki, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/659,771

(22) Filed: Apr. 19, 2022

(65) Prior Publication Data
US 2022/0344685 A1 Oct. 27, 2022

(30) Foreign Application Priority Data
Apr. 23, 2021 (JP) .................. 2021-073154

(51) Int. Cl.
*H01M 8/04* (2016.01)
*H01M 8/04537* (2016.01)
*H01M 8/04082* (2016.01)
*H01M 8/04791* (2016.01)

(52) U.S. Cl.
CPC ... *H01M 8/04552* (2013.01); *H01M 8/04201* (2013.01); *H01M 8/04798* (2013.01); *H01M 2250/20* (2013.01)

(58) Field of Classification Search
CPC ......... H01M 8/04552; H01M 8/04201; H01M 8/04798; H01M 2250/20
USPC .......................................... 429/404
See application file for complete search history.

(56) References Cited

U.S. PATENT DOCUMENTS

| | | | |
|---|---|---|---|
| 2012/0015267 A1* | 1/2012 | Yoshida ............ | H01M 8/04302 429/429 |
| 2014/0023945 A1 | 1/2014 | Epstein et al. | |
| 2014/0170510 A1* | 6/2014 | Choo ................ | H01M 8/04238 429/409 |
| 2015/0188164 A1 | 7/2015 | Yu et al. | |
| 2015/0325859 A1* | 11/2015 | Berretta ............ | H01M 8/04225 429/480 |
| 2019/0214664 A1* | 7/2019 | Sinha .............. | B60L 58/30 |

FOREIGN PATENT DOCUMENTS

JP 2017081559 A 5/2017

* cited by examiner

*Primary Examiner* — James M Erwin
(74) *Attorney, Agent, or Firm* — Dickinson Wright, PLLC

(57) ABSTRACT

A fuel cell system for air vehicles, wherein the fuel cell system comprises: a fuel cell, a fuel gas system for supplying fuel gas to the fuel cell, a potential sensor, and a controller; wherein the fuel gas system comprises a fuel gas supplier; wherein the controller determines whether or not a potential of the fuel cell measured by the potential sensor, is a reversal potential; and wherein, when the controller determines that the potential of the fuel cell is a reversal potential, the controller increases a fuel gas supply from the fuel gas supplier to the fuel cell.

3 Claims, 3 Drawing Sheets

FUEL CELL SYSTEM AND AIR VEHICLE

TECHNICAL FIELD

The disclosure relates to a fuel cell system and an air vehicle.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various studies have been made on fuel cells. For example, Patent Literature 1 discloses an aircraft using fuel cells.

Patent Literature 1: Japanese Patent Application Laid-Open (JP-A) No. 2017-081559

The on-board diagnostic system (OBD) of a fuel cell system mounted in an air vehicle has been studied.

In a fuel cell, when a fuel gas supply becomes insufficient, there is a possibility that a catalyst reacts and the potential of the fuel cell becomes a reversal potential.

In an air vehicle in flight, when the potential of the fuel cell becomes a reversal potential for reasons such as an insufficient fuel gas supply to the fuel cell, for example, it is necessary to limit the output of the fuel cell, and the flight of the air vehicle becomes unstable.

SUMMARY

The present disclosure was achieved in light of the above circumstances. An object of the present disclosure is to provide a fuel cell system configured to, even when there is a problem with the power generation of the fuel cell of an air vehicle in flight, stabilize the power output of the fuel cell for a predetermined amount of time and to increase the time for which the air vehicle can fly stably.

The fuel cell system of the present disclosure is a fuel cell system for air vehicles,
wherein the fuel cell system comprises:
a fuel cell,
a fuel gas system for supplying fuel gas to the fuel cell,
a potential sensor, and
a controller;
wherein the fuel gas system comprises a fuel gas supplier;
wherein the controller determines whether or not a potential of the fuel cell measured by the potential sensor, is a reversal potential; and
wherein, when the controller determines that the potential of the fuel cell is a reversal potential, the controller increases a fuel gas supply from the fuel gas supplier to the fuel cell.

The controller may monitor the potential of the fuel cell, and it may record an accumulated time in which the potential of the fuel cell is in a reversal potential state.

When the controller determines that the potential of the fuel cell is a reversal potential, the controller may determine whether or not the accumulated time is less than a predetermined amount of time.

When the controller determines that the accumulated time is less than the predetermined amount of time, the controller may increase the fuel gas supply from the fuel gas supplier to the fuel cell.

The air vehicle of the present disclosure is an air vehicle comprising the fuel cell system described above.

According to the fuel cell system of the present disclosure, even when there is a problem with the power generation of the fuel cell of an air vehicle in flight, the power output of the fuel cell is stabilized for a predetermined amount of time, and the time for which the air vehicle can fly stably, is increased.

BRIEF DESCRIPTION OF THE DRAWINGS

In the accompanying drawings.

DETAILED DESCRIPTION

Figure 1:
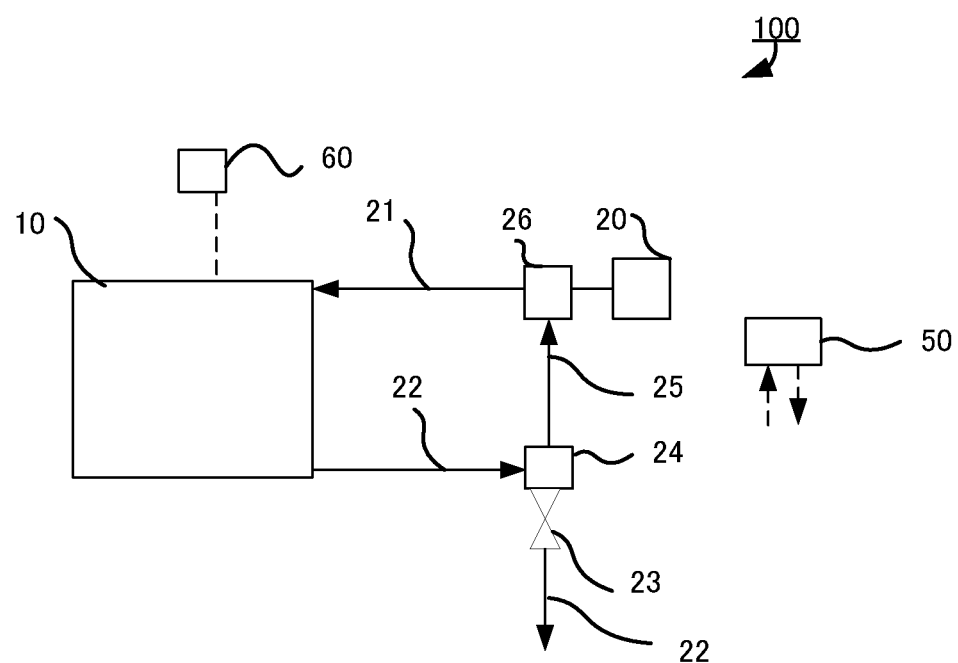
FIG. 1 is a schematic configuration diagram of an example of the fuel cell system of the present disclosure.

The fuel cell system of the present disclosure is a fuel cell system for air vehicles,
wherein the fuel cell system comprises:
a fuel cell,
a fuel gas system for supplying fuel gas to the fuel cell,
a potential sensor, and
a controller;
wherein the fuel gas system comprises a fuel gas supplier;
wherein the controller determines whether or not a potential of the fuel cell measured by the potential sensor, is a reversal potential; and
wherein, when the controller determines that the potential of the fuel cell is a reversal potential, the controller increases a fuel gas supply from the fuel gas supplier to the fuel cell.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell system of the present disclosure is mounted and used in an air vehicle.

The fuel cell system of the present disclosure may be mounted and used in an air vehicle that can fly by the power of a secondary cell.

The air vehicle of the present disclosure may be an aircraft. The aircraft may be an airplane, a vertical takeoff and landing aircraft or the like. The vertical takeoff and landing aircraft may be a helicopter, a drone or the like.

The air vehicle may include the fuel cell system of the present disclosure.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes the potential sensor.

The potential sensor measures the potential of the fuel cell. The potential may be a cathode potential or an anode potential.

The potential sensor is electrically connected to the controller. The controller detects the potential of the fuel cell measured by the potential sensor.

As the potential sensor, a conventionally-known electrometer or the like may be used.

The fuel cell system includes the fuel gas system.

The fuel gas system supplies fuel gas to the fuel cell.

The fuel gas system includes the fuel gas supplier.

The fuel gas system may further include a fuel gas supply flow path, an ejector, a circulation flow path, a gas-liquid separator, a fuel off-gas discharge flow path, and a gas and water discharge valve.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the air vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel cell system may include an oxidant gas system. The oxidant gas system may include an oxidant gas supplier, an oxidant gas supply flow path, an oxidant off-gas discharge flow path, an oxidant gas bypass flow path, a bypass valve, an oxidant gas flow rate sensor, and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the junction of the oxidant off-gas discharge flow path.

The bypass valve is disposed in the oxidant gas bypass flow path.

The bypass valve is electrically connected to the controller. By opening the bypass valve by the controller, when it is unnecessary to supply the oxidant gas to the fuel cell, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The fuel cell system may include the cooling system of the fuel cell.

The cooling system may include a refrigerant supplier and a refrigerant circulation flow path.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage device such as an electric double layer capacitor. The secondary cell may have a structure such that a plurality of secondary cells are connected in series. The secondary cell supplies power to the motor, the air compressor and the like. The secondary cell may be rechargeable by a power source outside the air vehicle, for example. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the air vehicle. The controller may be operable by an external power source even if the ignition switch is turned OFF.

The controller determines whether or not the potential of the fuel cell measured by the potential sensor, is a reversal potential.

When the controller determines that the potential of the fuel cell is a reversal potential, the controller increases the fuel gas supply from the fuel gas supplier to the fuel cell.

The fuel gas supply to be increased is not particularly limited, as long as it is larger than the fuel gas supply at the time of determination or the latest fuel gas supply. It may be appropriately set to a fuel gas supply that makes the potential of the fuel cell a positive potential.

In the present disclosure, even when the potential of the fuel cell becomes a reversal potential, the output of the fuel cell is not limited immediately. In the fuel gas system, the fuel gas supply is controlled to increase. When the potential of the fuel cell cannot be returned to a positive potential by this control, the output of the fuel cell is limited, or the fuel cell system is stopped.

The controller may monitor the potential of the fuel cell, and it may record the accumulated time in which the potential of the fuel cell is in a reversal potential state.

When the controller determines that the potential of the fuel cell is a reversal potential, the controller may determine whether or not the accumulated time is less than the predetermined amount of time.

when the controller determines that the accumulated time is less than the predetermined amount of time, the controller may increase the fuel gas supply from the fuel gas supplier to the fuel cell.

As the predetermined amount of time, for example, a time in which, when a time equal to or longer than the predetermined amount of time has passed, the potential of the fuel cell is assumed to be less likely to return from a reversal potential to a positive potential, may be appropriately set. By recording the accumulated time, when the potential of the fuel cell goes into a reversal potential state, returns to a positive potential state and then goes into a reversal potential state again, it can be determined whether or not the reversal potential state is a state of being likely to return to a positive potential.

In the present disclosure, the controller monitors the potential of the fuel cell, and it records the accumulated time in which the potential of the fuel cell is in a reversal potential state. When the accumulated time is equal to or longer than the predetermined amount of time, the output of the fuel cell is limited as soon as the potential of the fuel cell becomes a reversal potential, without increasing the fuel gas supply.

FIG. 1 is a schematic configuration diagram of an example of the fuel cell system of the present disclosure.

A fuel cell system 100 shown in FIG. 1 includes a fuel cell 10, a fuel gas supplier 20, a fuel gas supply flow path 21, a fuel off-gas discharge flow path 22, a gas and water discharge valve 23, a gas-liquid separator 24, a circulation flow path 25, an ejector 26, a controller 50, and a potential sensor 60. In FIG. 1, only the fuel gas system is illustrated, and other systems such as the oxidant gas system and the cooling system are not illustrated.

Figure 2:
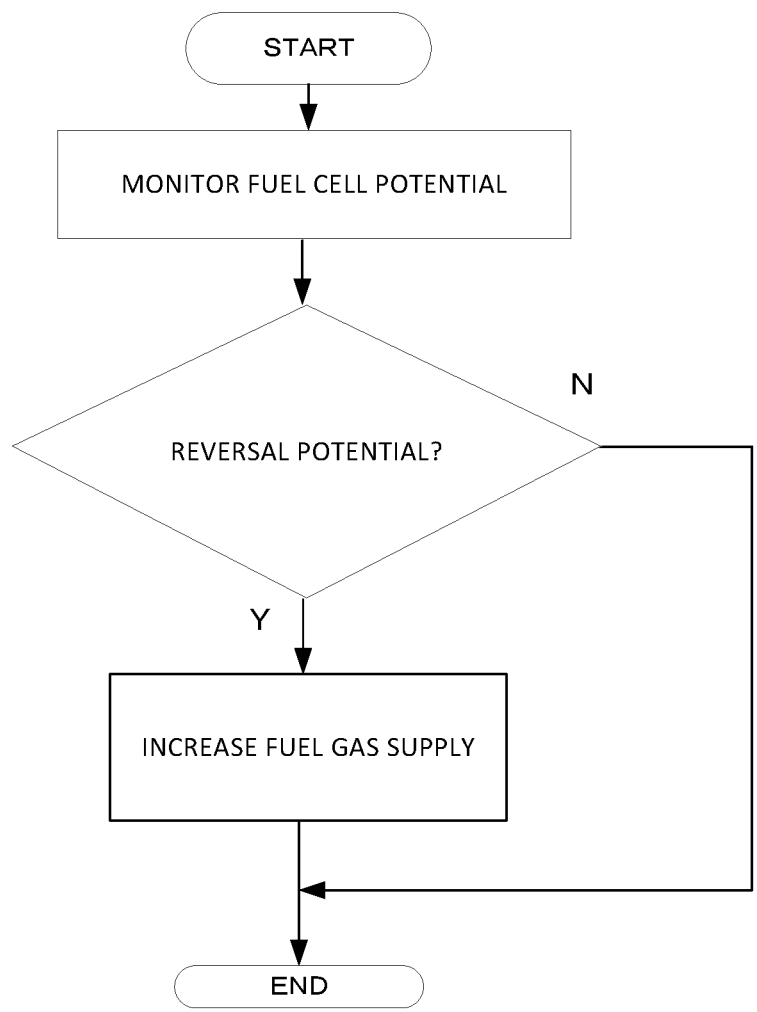
FIG. 2 is a flowchart illustrating an example of control of the fuel cell system of the present disclosure.

FIG. 2 is a flowchart illustrating an example of control of the fuel cell system of the present disclosure.

First, the controller monitors the potential of the fuel cell measured by the potential sensor.

Next, the controller determines whether or not the potential measured by the potential sensor is a reversal potential.

When the controller determines that the potential measured by the potential sensor is a reversal potential, the controller increases the fuel gas supply from the fuel gas supplier to the fuel cell larger than the latest supply, and the controller ends the control. Then, when the controller detects a change in the potential measured by the potential sensor from a reversal potential to a positive potential, the controller may record the time taken for the change in the potential of the fuel cell from the reversal potential state to the positive potential.

On the other hand, when the controller determines that the potential measured by the potential sensor is not a reversal potential, the controller may end the control, or the controller may maintain the latest fuel gas supply from the fuel gas supplier to the fuel cell and continue the monitoring.

Figure 3:
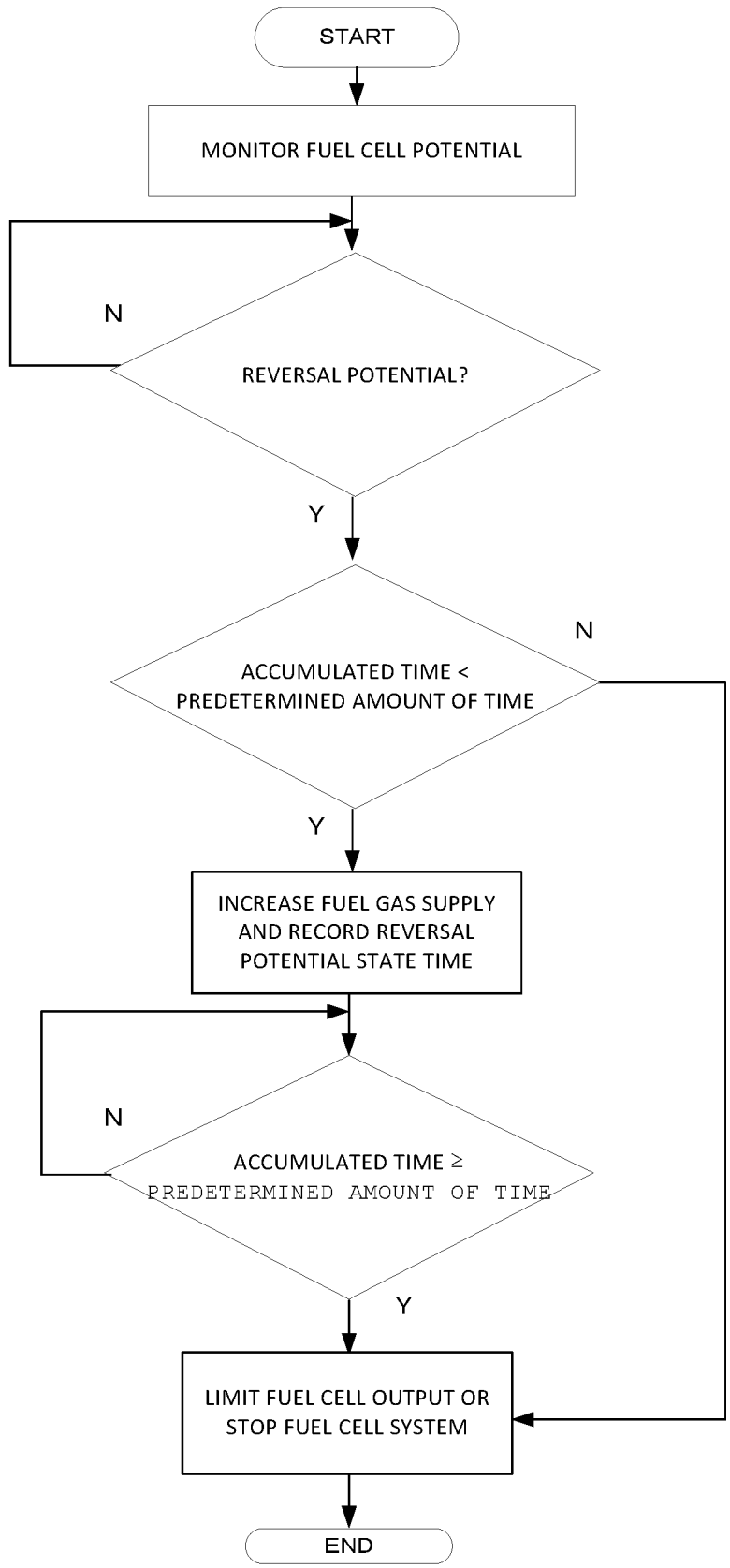
FIG. 3 is a flowchart illustrating another example of control of the fuel cell system of the present disclosure.

FIG. 3 is a flowchart illustrating another example of control of the fuel cell system of the present disclosure.

First, the controller monitors the potential measured by the potential sensor. In addition to this, the controller may record the accumulated time in which the potential of the fuel cell is in a reversal potential state.

Next, the controller determines whether or not the potential measured by the potential sensor is a reversal potential.

When the controller determines that the potential measured by the potential sensor is not a reversal potential, the controller may end the control, or the controller may maintain the latest fuel gas supply from the fuel gas supplier to the fuel cell and continue the monitoring.

On the other hand, when the controller determines that the potential of the fuel cell is a reversal potential, the controller determines whether or not the accumulated time in which the potential of the fuel cell is in a reversal potential state, is less than the predetermined amount of time.

When the controller determines that the accumulated time is equal to or longer than the predetermined amount of time, the controller limits the output of the fuel cell, or the controller stops the fuel cell system and ends the control.

On the other hand, when the controller determines that the accumulated time is less than the predetermined amount of time, the controller increases the fuel gas supply from the fuel gas supplier to the fuel cell. In addition to this, the controller records the time in which the potential of the fuel cell is in a reversal potential state. Next, the controller determines whether or not the accumulated time is equal to or longer than the predetermined amount of time. When the controller determines that the accumulated time is less than the predetermined amount of time, the controller continues to record the time in which the potential of the fuel cell is in a reversal potential state. On the other hand, when the controller determines that the accumulated time is equal to or longer than the predetermined amount of time, the controller limits the output of the fuel cell, or the controller stops the fuel cell system and ends the control.

REFERENCE SIGNS LIST

10. Fuel cell
20. Fuel gas supplier
21. Fuel gas supply flow path
22. Fuel off-gas discharge flow path
23. Gas and water discharge valve
24. Gas-liquid separator
25. Circulation flow path
26. Ejector
50. Controller
60. Potential sensor
100. Fuel cell system

The invention claimed is:

1. A fuel cell system for air vehicles,
wherein the fuel cell system comprises:
a fuel cell,
a fuel gas system for supplying fuel gas to the fuel cell,
a potential sensor, and
a controller;
wherein the fuel gas system comprises a fuel gas supplier;
wherein the controller determines whether or not a potential of the fuel cell measured by the potential sensor, is a reversal potential; and
wherein, when the controller determines that the potential of the fuel cell is a reversal potential, the controller increases a fuel gas supply from the fuel gas supplier to the fuel cell.

2. The fuel cell system according to claim 1,
wherein the controller monitors the potential of the fuel cell, and it records an accumulated time in which the potential of the fuel cell is in a reversal potential state;
wherein, when the controller determines that the potential of the fuel cell is a reversal potential, the controller determines whether or not the accumulated time is less than a predetermined amount of time; and
wherein, when the controller determines that the accumulated time is less than the predetermined amount of time, the controller increases the fuel gas supply from the fuel gas supplier to the fuel cell.

3. An air vehicle comprising the fuel cell system defined by claim 1.

* * * * *